Figure 1:
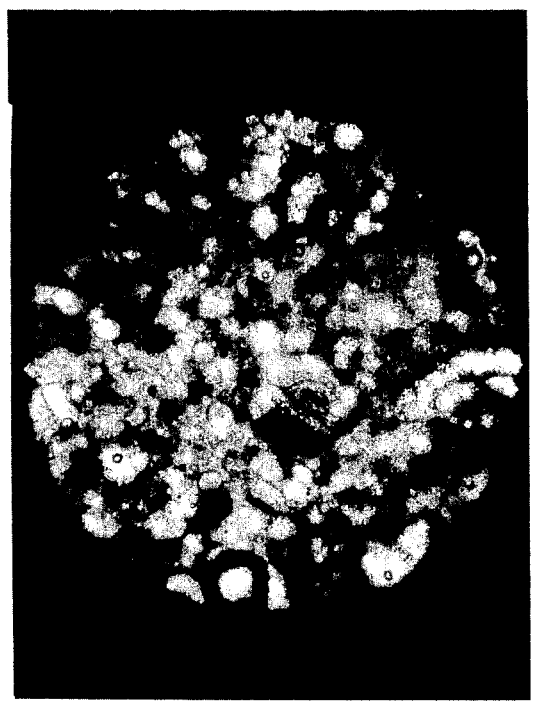

United States Patent [19]

Suderman

[11] Patent Number: 4,588,600
[45] Date of Patent: May 13, 1986

[54] DRY PREMIX COMPOSITION FOR IMPARTING A FRIED APPEARANCE TO BAKED FOODS

[75] Inventor: Darrel R. Suderman, Middleburg Heights, Ohio

[73] Assignee: SCM Corporation, New York, N.Y.

[21] Appl. No.: 486,254

[22] Filed: Apr. 18, 1983

[51] Int. Cl.$^4$ ............................................. A21D 10/00
[52] U.S. Cl. ..................................... 426/555; 426/652
[58] Field of Search ............... 426/601, 606, 553, 555, 426/293, 296, 652, 653, 622

[56] References Cited

U.S. PATENT DOCUMENTS

| | | | |
|---|---|---|---|
| 2,623,825 | 12/1952 | Tressler et al. | 99/94 |
| 2,910,370 | 10/1959 | Rogers et al. | 99/194 |
| 3,236,654 | 2/1966 | Lipka et al. | 99/93 |
| 3,508,929 | 4/1970 | Callaghan | 426/555 |
| 3,586,512 | 6/1971 | Mancuso et al. | 99/100 |
| 3,676,158 | 7/1972 | Fischer et al. | 99/166 |
| 3,723,137 | 3/1973 | Fischer et al. | 99/166 |
| 3,843,827 | 10/1974 | Lee et al. | 426/293 |
| 3,852,501 | 12/1974 | Fazzina et al. | 426/293 |
| 4,068,009 | 1/1978 | Rispoli et al. | 426/291 |
| 4,208,442 | 6/1980 | Evans et al. | 426/296 |
| 4,218,485 | 8/1980 | Lee et al. | 426/296 |
| 4,260,637 | 4/1981 | Rispoli et al. | 426/96 |
| 4,330,566 | 5/1982 | Meyer et al. | 426/606 |
| 4,451,491 | 5/1984 | Trop | 426/555 |

FOREIGN PATENT DOCUMENTS 1367566  9/1974  United Kingdom ............... 426/293

Primary Examiner—Raymond N. Jones
Assistant Examiner—Elizabeth A. King
Attorney, Agent, or Firm—Richard H. Thomas

[57] ABSTRACT

A dry, edible food coating premix composition, blendable with liquid oil or shortening and water, to form a batter which, when applied to the surface of a food item such as chicken, fish, or vegetables, provides on baking the taste, and a variegated appearance and texture of a batter coated deep or pan fried such item, comprising a farinaceous material in flour form; a normally plastic or hard shortening or fat; said flour and shortening or fat being intensively mixed by impact mixing.

23 Claims, 2 Drawing Figures

DRY PREMIX COMPOSITION FOR IMPARTING A FRIED APPEARANCE TO BAKED FOODS

TECHNICAL FIELD

The present invention relates to a dry premix suitable for preparation of a batter coating which can be applied to a comestible, and which on baking provides the taste, texture and appearance of a fried or deep-fat fried comestible. The dry premix of the present invention is made into a batter by simple mixing with a liquid oil or shortening, and water.

The dry premix of the present invention is characterized as containing about 48–85% farinaceous materials and about 2–12% normally plastic or hard shortening or fat. It is contemplated that the formation of the batter will take place with addition, by the ultimate user, of liquid oil and water, in the proportion of about 15–45% liquid oil to 85–55% dry premix, and an effective amount of water to obtain a batter consistency.

Following coating a comestible with the batter of the present invention, conventional baking procedures, for instance 20 to 50 minutes at 475° F., are used to complete cooking. This results in a crisp, golden-brown, substantially continuous coating which is variegated in both texture and coloring closely resembling a fried or deep fat-fried coating. The coating can have a puffed appearance with the use of leavening agents.

BACKGROUND ART

It is known to coat various comestibles, such as fish or chicken, with a coating which on baking provides a product which attempts to simulate one which has been fried or deep-fat fried. Many such coatings are dry mixes which are applied to a moistened surface of a comestible as a dry mix (not a batter) to adhere to the comestible. Others are in the form of combined batter and breading mixes wherein the breading is relied upon to give a crispness and appearance somewhat characteristic of a fried or deep-fat fried comestible. A third category of coatings of the prior art are premixed, storage-stable batters which require refrigeration, but which can be applied to the surface of a comestible.

As far as is known, it is believed to be novel to provide a dry mix, which on blending with water and liquid vegetable oil, provides a batter having, on baking, a fried or deep-fat fried appearance, texture and taste.

Dry mixes are known to prepare batters for a variety of products, for instance cakes. The product of the present invention is readily distinguishable from a cake or bread as the end product has neither the light, soft, airy texture of a cake, nor the bready texture of a bread product. Rather, the end product coating of the present invention is in the nature of a true coating, having a unique crisp texture, an irregular, variegated, but browned appearance, and resembling in these and other respects, which will become apparent, a fried or deep-fat fried, batter coated product.

In this respect, frying or deep fat frying of a batter coated comestible imparts a unique, crisp, slightly oily, golden-browned appearance to a comestible. The coating usually is irregular in shape and although substantially continuous on the surface of the comestible, is not completely continuous since some of the coating is removed or eroded from the surface by the frying step or agitation of oil in the deep fryer. The surface is only partly uniform in appearance, but again, not completely so, being characterized by interspersed dark and light brown areas, and large, small and medium sized particles.

It is an object of the present invention to simulate this type of an appearance and texture in a baked product.

Prior U.S. Pat. No. 2,623,825 to Tressler et al, describes a batter mix which is about 70% flour, 8% dehydrated whole egg, 5% non-fat dry milk solids, 9% melted vegetable shortening and 1% pectin. The shortening is added slowly, in melted form, to the dry ingredients with continuous mixing. The batter is designed specifically for deep-fat frying, and for use with a breading mix to obtain what is said to be a rich, brown crust. The composition is notably low in oil content, and would not be suitable for baking.

Prior U.S. Pat. No. 3,236,654, to Lipka et al, is directed to a breading coating suitable for baking of comestibles. The breading in this patent contains a flour, as a starch source, and gluten as a gluten source, optionally mixed with oil. The patent is not directed to the preparation of batter, or a dry mix for batters.

Prior U.S. Pat. No. 3,586,512, to Mancuso et al, describes a dry-flowable mix type of coating which can be applied to a food item by shaking the mix and food item together in a closed envelope. The dry mix contains a powdered fat, farinaceous material, flavoring ingredients, and a dye which, on cooking, develops a desired color. The dry mix is not suitable for preparation of a batter and application, as such, to a comestible for subsequent baking.

The Mancuso et al patent refers to a prior Rogers et al U.S. Pat. No. 2,910,370, which discloses frozen poultry coated with a flavored batter containing bread, flour and water. The batter-coated food is treated with a supplementary breading and fat coating and frozen. The breading and fat are relied upon to impart a brown color to the foodstuff when baked, said to simulate a pan-browned or deep-fat fried food. The batter preparation without breading would not give a crisp, browned appearance and texture.

Mancuso et al also makes reference to the concept of providing a coating which has a "high content of saturated fat combined with stearin" to provide an appearance, color and texture similar to that of a coated, deep-fat fried food. It is not clear in the patent what kind of coating the reference is to.

Prior U.S. Pat. No. 3,676,158 to Fischer et al, describes what is said to be a conventional, wet, puff-batter mix suitable for baking or frying, comprising a blend of wheat and corn flour, flavorings, leavening agent and other ingredients. A breading also is applied to obtain crispness. A characteristic of the method of this patent is the use of what is said to be a gel-forming material such as casein or alginate, which provides a skin over the food product, the wet batter then being applied to the skin-enveloped product. Although the patent makes reference to baking, in addition to frying, no examples specific to baking are given. There is no disclosure of a dry batter premix, or a batter mix having a high fat or shortening content. A similar disclosure, is set forth in prior U.S. Pat. No. 3,723,137, also to Fischer et al.

Prior U.S. Pat. No. 3,843,827, to Lee et al, describes a batter dry mix for a batter consisting of flour, shortening, corn starch and flavorants. The dry mix is blended with milk and a raw egg to form a batter. A second dry breading mix is also used to obtain color and crispness. The batter and breading mixes are said to simulate, on baking, a fat-fried texture and appearance. The batter itself is of a different type than in the present invention.

One problem with the process of this patent is that it requires two separate pouches; one for the batter ingredients, and one for the dry breading mix coating, and complicated consumer preparation.

Prior U.S. Pat. No. 3,852,501, to Fazzina et al, describes a coating of the dry mix type adapted to be applied to a moistened foodstuff. The coating of this patent is not a batter. The coating comprises a relatively high level of shortening (10–50%) with 8–35% farinaceous material, 15–35% starch hydrolyzate, and 5–18% modified food starch.

U.S. Pat. No. 4,208,442, to Evans et al, describes a coating premix, which is also not a batter, comprising 60–78% bulking agent (flour plus crumbs or fines) 3–13% protein, and 4–13% binding agent. The flours can be wheat, potato, tapioca, rice and corn. The rice and corn flour are said to be useful for "optimum crispness". The protein is gelatin, sodium caseinate, soy protein isolate, and egg albumin. The binding agent is modified starch and dextrin. Similar dry-coating (not batter) disclosures are contained in subsequent U.S. Pat. Nos. 4,218,485 (Lee et al) and 4,260,637 (Rispoli et al). The latter patent is a dry bread crumb coating and includes wheat gluten as a suitable source of protein.

The Evans et al patent refers to the prior Lee et al (U.S. Pat. No. 3,843,827) and Mancuso et al (U.S. Pat. No. 2,910,370) patents, and the problems experienced with the coatings thereof in terms of texture and mouth feel characteristics.

Prior U.S. Pat. No. 4,330,566, to Meyer et al, also refers to the disadvantages of the Lee et al and Rispoli coatings (U.S. Pat. Nos. 3,843,827 and 4,068,009) and also the Mancuso et al U.S. Pat. No. 3,586,512, and allegedly overcomes these disadvantages by the provision of a shelf-stable prepared batter (which is not a dry mix).

DISCLOSURE OF INVENTION

The present invention constitutes an improvement in the provision of a unique dry, edible food composition which is blendable with liquid oil and water to form a batter, which blend when applied to the surface of a food item such as chicken, fish, or vegetables, provides on baking the taste, appearance and texture of a batter coated, deep or pan fried such item, the dry composition comprising about 48–85% farinaceous material in flour form; and about 2–12% normally plastic or hard shortening or fat, the flour and shortening or fat being intensively mixed by impact mixing.

The present invention also resides in a batter coating composition containing said dry food composition, as stated, further comprising about 17–80% added liquid vegetable oil or shortening, based on the weight of the dry premix composition, and an effective amount of water to make a batter.

The present invention still further resides in a process for imparting to a baked, coated comestible the taste, texture and appearance of a fried coated such comestible comprising preparing a dry mix comprising about 48–85% of a farinaceous material in flour form; and about 2–12% of a normally plastic or hard shortening or fat; said percentages being based on the weight of the dry mix; intensively mixing said flour and shortening or fat by impact mixing; blending with the dry mix a liquid vegetable oil or shortening and an effective amount of water to make a batter, the vegetable oil or shortening being about 17–80% of the weight of the dry mix; and baking said coated comestible on a lightly oiled surface.

Although not bound by any theory, it is believed that plating the plastic fat particles onto individual dry particles of the dry ingredients, by impact mixing, may render some of the dry particles more resistant to hydration than others. On combining the dry mix with water and liquid oil, to form a batter, there may result a liquid oil/water matrix in which the dry particles are fairly uniformly dispersed. Normally, this would be likely to result, on baking, in a uniform appearance and structure.

However, it is believed that because some of the dry particles are more resistant to hydration than others, the appearance and texture are by contrast quite variegated, as desired, leaving some areas more puffed than others, some areas browner than others, some particles in the structure larger than others, and even some areas uncoated, very closely simulating the appearance of a pan-fried or deep-fat fried product.

A similar effect was obtained with the use of what is called a suspended solids fluid shortening, comprising a liquid shortening in which amounts of a hard fat such as stearine are suspended. However, the lipid blend of the present invention has the advantage over a suspended solids fluid shortening that two separate pouches are not required, one for the dry ingredients and one for the suspended solids fluid shortening. By impact mixing, the hard or plastic shortening component of the lipid blend of the present invention can be readily packaged with the dry ingredients in a single pouch. The fluid vegetable oil or shortening component of the lipid blend is then easily added to the above ingredients by the housewife, most households having a liquid vegetable oil or shortening in the kitchen as a staple ingredient.

With regard to this aspect of the present invention, the ratio of fluid vegetable oil or shortening to hard or plastic shortening or fat varies from about 40:1 to about 1.5:1.

In a preferred embodiment of the present invention, the farinaceous material is a blend of flours including corn flour and rice flour, to provide crispness to the coating. The composition of the present invention, preferably, is free of wheat flour, but does contain as a structure-building ingredient, a heat coaguable protein film former such as vital wheat gluten, egg albumin, egg white solids, and/or gelatin, 0 to 30% by weight of the total composition. A preferred structure-building blend is a combination of vital wheat gluten and egg white solids. It is also desirable to include in the dry mix composition of the present invention a small amount of a hydrocolloid gum to aid in the batter formation and provide a viscosity control for improved adhesion of the batter to the comestible being cooked.

A further preferred ingredient of the present invention is a leavening agent such as sodium bicarbonate, sodium aluminum phosphate, or blend thereof.

On cooking, the blend of flours, in an amount of about 48–85% of the dry mix composition, aided by the vital wheat gluten and egg white solids, forms a substantially continuous film or envelope expanded in a somewhat irregular manner by moisture evolved from the comestible being cooked, and the leavening agent, developing an irregular cell formation within the coating, as previously stated, and desired. This results in a browned, light, crisp structure, as desired, similar to that of a crust of bread, but less bready in texture due to the use of flours other than wheat flours. By the use of vital wheat gluten, and limiting the amount of egg white solids used, a structure which is less airy and stronger than a cake structure is obtained. The result can be said to be a controlled structure development, without overforming the structure. For instance, a bready structure would be an overformed structure in the application of the present invention.

Figure 2:
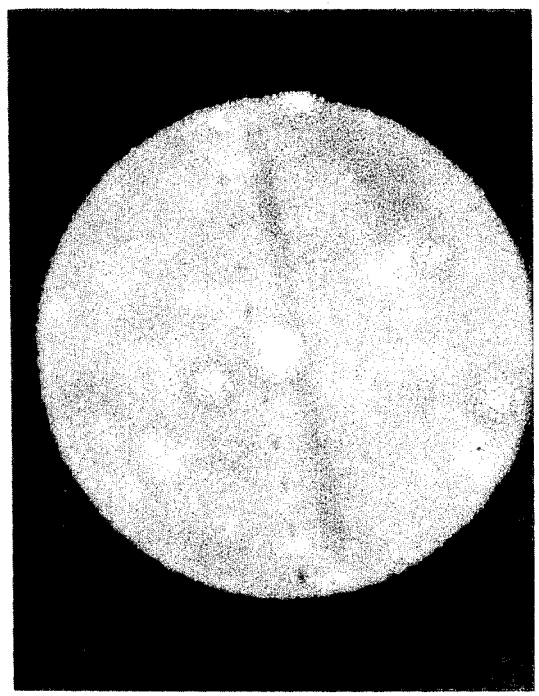

The inventions and advantages thereof will become more apparent upon consideration of the following specification, with reference to the accompanying drawings, in which FIG. 1 is an electron microscope photograph, taken at a magnification of 100 power, of a non-baked batter coating on a comestible made in accordance with the concepts of the present invention; and FIG. 2 is an electron microscope photograph of a non-baked batter coating prepared using more conventional procedures, also taken at a magnification of 100 power.

BEST MODE FOR CARRYING OUT THE INVENTION AND INDUSTRIAL APPLICABILITY

In the practice of the present invention, a blend of flours is preferred, as the bulking ingredient in preparation of the batter, and the flours are preferably non-structure building flours (in the sense that wheat flour is a structure-building flour). This rules out all of the wheat flours which are high in coagulable protein, namely glutenin and gliadin. It is the intention in the present invention to use the flours more as bulking agents, and to rely on controlled amounts of structure-building proteins such as vital wheat gluten, to obtain an engineered structure.

A large number of flours in this category can be employed, such as corn flour, oat flour, barley flour, rye flour, Durham flour, rice flour, and soy flour.

A preferred flour composition is a blend of flours in effective amounts to give color and crispness, in addition to bulk, to the end product. A particularly effective such combination was found to be corn flour, rice flour, and soy flour. All three flours provide crispness to the end product, although in slightly differently ways, all flours in addition contributing to browning, by the Maillard reaction. The use of corn flour alone would result in a product too dense, so that the rice flour tends to lighten up the batter and coating, while at the same time giving additional crispness. However, too much rice flour would detract from color formation, so that soy flour can effectively be employed to make up the balance of the flour content, providing both crispness and color formation.

To obtain good bulk, about 40–60% of the flour content can be corn flour, without obtaining too dense a product. About 25–50% of the flour content can be rice flour without adversely affecting color formation. The balance, about 15–25%, can be the soy flour. This blend provides not only a viscous batter slightly thicker than an ordinary cake batter, but also an end product which is crispy or corny in structure, golden-brown, non-bready, with a fried color and texture.

One corn flour that can be used in the practice of the present invention is degermed yellow corn flour, marketed by Lauhoff Grain Co., under the trademark CCF 605 V. This flour has a typical protein content of 7–8.5, an oil content of 0.8–1.6, a fiber content of about 0.4–0.6, and an ash content of about 0.3–0.6.

A rice flour which can be employed is River Rice Flour RL-100 (trademark Riviana Foods, Inc.) having a protein content of about 6.5–8.5%, a fat content of about 0.5–1%, a fiber content of about 0.3–0.7%, and an ash content of about 0.4–0.8%. One soy flour which was used in the practice of the present invention was a defatted soy flour (Bakers' Nutrisoy) marketed by Archer Daniels Midland Company, containing about 52% protein, about 6% ash, about 1% fat, about 3% fiber, and about 30% carbohydrate.

Other defatted soy flours of similar composition can be employed.

The principal structure-building ingredient of the present invention is vital wheat gluten, employed in an amount of about 0–20%, based on the weight of the dry mix (which includes plastic shortening, but not the liquid oil and water ingredients added to make the batter). One suitable such gluten is SuperGluten-80, marketed by Industrial Grain Products. This gluten has about 80.5% protein (primarily glutenin and gliadin), about 6% moisture, about 1% ash. On the addition of water and oil, the gluten hydrates with water, forming an interlaced protein structure which develops during the baking process.

A preferred amount of wheat gluten is about 8–14%, providing an optimum structure in the final product with the above mentioned flour combination. However, it should be apparent to those skilled in the art that the wheat gluten could be replaced, at least in part, by the use of a high-protein wheat flour in the flour blend.

In the practice of the present invention, two other structure-building ingredients may be employed with advantage, namely an amount of egg white solids, and a suitable hydrocolloid gum. These are employed in the proportions of about 0–10% and 0–2% respectively. The function of the gum is to strengthen and extend the protein ingredients, and also to improve the body of the batter and flow properties thereof, and permit uniform coverage and adhesion of the batter to the food product which is being coated. This is during the period prior to heat coagulation of other film-forming or structure-forming ingredients in the batter.

A suitable gum is xanthan gum, marketed by Kelco Co., under the trademark KELTROL F, another being carrageenan. Gum arabic and guar gum may also be employed.

The egg white solids film former has a relatively low coagulation temperature, and functions as a structure-building ingredient during the interim period prior to structure formation by the wheat gluten. A non-whipping egg white solids is necessary to prevent excessive foaming and development of fine air cell structures. The amount should be limited to less than about 10%, for instance about 5% based on the total dry premix. An example of egg white solids that may be employed is spray dried solids of the non-whipping type (type P-11 marketed by Henningsen Foods, Inc.). A preferred amount is in the range of about 2–8%.

In this regard, it is a function of the batter, and the formation of a structure on cooking, to not only trap gas produced by leavening agents employed, but also to trap a certain amount of moisture in the form of water vapor from the food product being cooked. The egg white solids serve to do this initially in the structure development stage. The leavening agents which may be employed in the present invention are conventional, and are employed in effective amounts to provide an expanded structure enveloping the food product being cooked. Examples of suitable such leavening agents are sodium bicarbonate, sodium aluminum phosphate, and blends thereof. An effective amount is about 0-10%, preferably about 5-7%.

Another ingredient that may be employed in the practice of the present invention is a whole egg replacer or substitute, for instance WER BASE, marketed by Stauffer Chemical Co. This product contains whey, soy flour, wheat flour, partially hydrogenated vegetable oil, lecithin, cellulose gum, glycerin, POLYSORBATE 60, and carrageenan. Such ingredient would normally be used in very small amount, for instance about 0-2%. In addition to providing some emulsification, from the lecithin, POLYSORBATE 60 and carrageenan, and thickening of the batter from the gums, the product provides some emulsification stability similar to that that would be obtained by the use of whole egg. It also, in the present invention, appears to add some degree of crispness to the end product, possibly functioning as a film-forming agent in this respect.

It is an aspect of the present invention that the dry mix composition preferably is substantially free of both starch and saccharides. Starch would not normally be used, even though it is a known structure builder, since it tends to bind water, not readily releasing it during baking as would occur in a deep fat frying medium, and could adversely affect crispness of the end product. It is too hygroscopic. Saccharides such as sugar, glucose and dextrose, can affect flavor of the end product, but more important, can cause excessive browning. Other ingredients which are employed in the practice of the present invention are flavorants, preservatives, and the like, in effective amounts.

An essential ingredient of the present invention is an amount of plastic or solid shortening or fat which is blended with the dry mix ingredients mentioned above, by what can be referred to as "impact mixing". This is a type of mixing, using a cake finisher, by which the fat, broken up into small particles, is coated onto grains of flour and other solid ingredients, in an irregular or somewhat imperfect manner. To accomplish this, the fat or shortening should have a melting point of at least about 90° F., preferably in the range of about 90° F. to about 135° F.

Although a suitable such plastic or solid shortening or fat can be stearine, a preferred such fat or shortening is a plastic, partially hydrogenated vegetable oil. One example of such a plastic fat is CREAMTEX (trademark, SCM Corporation), having a WMP of about 111°-119° F. and an AOM of 40 hours, minimum. Another suitable shortening is DIAMOND D-10, (trademark, SCM Corporation), a plastic, partially hydrogenated vegetable oil also having a WMP of about 111°-119° F. and an AOM of 40 hours, minimum. By the term "plastic", it is meant solid or plastic at room or ambient temperature.

Preferably, the amount of plastic shortening used is about 2-12%, based on the total weight of the dry premix (without liquid oil or shortening and water, subsequently added), a preferred amount being about 4-8%. To a degree, the amount employed depends upon the type of equipment employed for the blending operation. In a conventional cake finisher, an amount of plastic shortening in excess of about 5-7% may tend to ball up in the finisher or thereafter.

The use of impact mixing or a cake finisher is an important aspect of the present invention in that it tends to disperse the shortening throughout the dry ingredients in such a way that the shortening becomes indistinguishably blended in the dry ingredients, resulting in a somewhat clumpy, but still floury, dry product. The product is not gritty, such as a cake flour would be. This dispersal is important. It is believed to impart to discrete portions of the mix a certain amount of resistance to water absorption or hydration as indicated above, dramatically affecting the appearance of the end product.

This is evident by comparing the samples of FIGS. 1 and 2, the sample of FIG. 2 being made using only Wesson Oil as the lipid ingredient, that of FIG. 1 being made using the combination of a liquid oil and plastic shortening.* In other words, the only difference between the compositions of FIGS. 1 and 2 is the presence of plastic shortening applied by impact mixing to the dry ingredients in the sample of FIG. 2. As shown in FIGS. 1 and 2, the sample of FIG. 2 presents a very smooth, homogeneous appearance, whereas the sample of FIG. 1 is irregular and variegated, contributing to the appearance of a deep or pan-fried product. Again, it is surmised that the discrete portions of solid fat, applied to discrete amounts of dry particles, renders the same somewhat resistant to hydration. Although the fat melts, ultimately, in the baking process, a certain amount of the structure may by that time be pre-established, so that those areas resistant to hydration may tend to develop differently than other portions of the coating which were more hydrated. The result, in any event, is a variegated structure.

*The photographs of FIGS. 1 and 2 were taken of the batter prior to baking. It was surmised that during baking the normally solid lipid would melt and its dispersal in the batter would make it indistinguishable. Since the structure of the final product is probably a reflection of the structure prior to baking, it was thus believed that photographs taken prior to baking would be more revealing than photographs taken after baking.

The liquid oil used can be any oil or shortening available to the end user. This, and the water, normally would be added by the end user. Based on the weight of the dry mix (including plastic shortening), i.e., the premix, the amount of liquid oil can vary from about 17% to about 80%, a representative amount by way of example being about 71%. An effective amount of water may be an amount equal to the premix weight.

The following examples illustrate the present invention.

EXAMPLE I

In this example, the following dry ingredients were blended together in a ribbon blender:

| | EXAMPLE I | | |
| --- | --- | --- | --- |
| | Approximate Percent | | |
| Ingredient | Basis - Dry Ingredients of premix minus plastic shortening | Basis - Total premix composition | Basis Flour weight |
| Yellow corn flour | 32 | 30.4 | 47 |
| Rice flour | 24 | 23 | 35 |
| Soy flour | 12 | 11.4 | 18 |
| Vital wheat gluten | 12 | 11.4 | 100 |

-continued

EXAMPLE I

| Ingredient | Basis - Dry Ingredients of premix minus plastic shortening (Approximate Percent) | Basis - Total premix composition | Basis Flour weight |
|---|---|---|---|
| Egg white solids | 5.3 | 5.1 | |
| Sodium bicarbonate | 3.3 | 3.1 | |
| Sodium aluminum phosphate | 3.3 | 3.1 | |
| Salt | 4 | 3.8 | |
| Whole egg replacer | 1.2 | 1.1 | |
| Xanthan gum | 1.2 | 1.1 | |
| Monosodium glutamate | .4 | .4 | |
| Flavorants including onion powder, garlic powder, seasoning | 1.3 | 1.1 | |
| | 100% | 95% | |

To the above dry ingredients, about 5% CREAM-TEX, based on the weight of the total premix composition, was added, using a cake finisher of conventional design. This equipment is in the form of a vertical column having rotating blades within the column. The dry ingredients were fed at a controlled rate into the top of the column for one pass through the column. The fat which was previously broken into small particle sizes, similar to the particle sizes of the dry ingredients, were added with the dry ingredients at the top of the tower.

Residence time within the column was about 5-15 seconds, enough to disperse the plastic shortening onto the dry particulates, so that the shortening became indistinguishable in the dry mix, but not enough to completely uniformly disperse the plastic shortening throughout the dry ingredients.

Other types of equipment than a cake finisher could be employed, for instance a cut-in agitator marketed by Day Mixing Co., Cincinnati, Ohio.

Following the above, the dry mix is mixed with water and liquid vegetable oil in the proportion of about 41% oil, based on the weight of the dry premix, and 100% by weight water, also based on the dry premix. The batter is then applied to lightly floured, cut-up chicken pieces, which are then placed on a lightly greased baking sheet and baked for 45-50 minutes in an oven preheated to 475° F.

EXAMPLE II

A similar formulation as in Example I, having slightly less corn flour, slightly less leavening agents, and a different seasoning blend, was applied to the surface of thawed fish fillets, which were then baked in an oven preheated to 475° F. for 20-25 minutes. Good results have also been obtained with frozen fish fillets.

In both Examples 1 and 2, a variegated, crisp, golden-brown coating structure was obtained, having an oiliness similar to that of a pan-fried or deep-fat fried product.

Based on the above examples, and other data, the following Table gives proportions of ingredients for a representative composition of the present inventions:

TABLE I

| Ingredient | Basis flour weight | PROPORTION Basis total weight of premix without liquid shortening | Basis total batter composition minus water | Basis weight of plastic shortening |
|---|---|---|---|---|
| Corn flour | 40-60% | 48-85% | | |
| Rice flour | 25-40% | | | |
| Soy flour | 15-25% | | | |
| Wheat gluten | | 0-20% | | |
| Egg white solids | | 0-10% | | |
| Sodium bicarbonate | | | | |
| Sodium aluminum phosphate | | 0-10% | | |
| Salt | | — | | |
| Whole egg replacer | | 0-2% | | |
| Hydrocolloid gum | | 0-2% | | |
| Monosodium glutamate | | — | | |
| Flavorants | | — | | |
| Plastic shortening | | 2-12% | | |
| Liquid shortening | | 17-80% | 15-45% | 40-1.5% |
| Water | | effective amount | | |

I claim:

1. A dry, edible food coating premix composition consisting essentially of batter forming ingredients in effective amounts to form, on blending with liquid oil or shortening and water, a batter which, when applied to the surface of a food item, provides on baking a substantially continuous coating having the taste, and a variegated appearance and texture of a batter coated deep or pan fried food item, said batter forming ingredients including, based on the weight of the composition
   about 48-85% of a farinaceous material in flour form;
   about 2-12% of a plastic or hard shortening or fat;
   said flour and shortening or fat being mixed by impact mixing; and
   at least one structure-building ingredient in an effective amount to form said substantially continuous coating.

2. The dry food composition of claim 1 wherein about 40-60% by weight of said farinaceous material is corn flour.

3. The dry food composition of claim 2 wherein said farinaceous material is by weight about 40–60% corn flour and about 25–50% rice flour, said composition being free of wheat flour.

4. The dry food composition of claim 3 further comprising about 15–25% soy flour based on the total weight of said farinaceous material.

5. The dry food composition of claims 1, 2, 3 or 4, said structure building ingredient is a heat coagulable protein film former.

6. The composition of claim 5 wherein said film former is selected from the group consisting of egg white solids, vital wheat gluten, and blends thereof up to about 30% by weight of the total composition.

7. The dry food composition of claim 1 containing a leavening agent in an effective amount to provide an expanded structure enveloping the food item upon baking.

8. The dry food composition of claim 1 further comprising a hydrocolloid gum in an amount to aid in the batter formation formed from said premix and also provide a viscosity control for improved adhesion of the batter to the food item upon baking, up to about 2% by weight of the total composition.

9. The dry food composition of claim 1 wherein said farinaceous material is a blend of corn flour, rice flour and soy flour in effective amounts to give color and crispness.

10. The dry mix of claim 1 which is substantially free of saccharides and starches.

11. A batter comprising the dry composition of any of claims 1, 2, 3, 4, 7, 8, 9, or 10, further comprising an effective amount of water to make a batter, and about 17–80% liquid vegetable oil or shortening by weight of the dry composition.

12. A dry, edible food coating premix blendable with a liquid oil or shortening and water, to form a batter which, when applied to the surface of a food item, provides on baking a substantially continuous coating having the taste, and a variegated appearance and texture of a batter coated deep or pan fried food item, comprising
about 48–85% of a farinaceous material in flour form, of which a substantial portion, effective to provide crispness, is a crisp-tending flour or blend of crisp-tending flours;
about 2–12% of a plastic or hard shortening or fat which is mixed with said flour by impact mixing;
a heat coagulable protein film former in an amount up to about 20%, said amount being sufficient to control structure development in the coating upon baking;
a leavening agent in an effective amount to provide an expanded structure enveloping the food item upon baking; and
a hydrocolloid gum in an amount to aid in the batter formation formed from said premix and also provide a viscosity control for improved adhesion of the batter to the food item upon baking, up to about 2%.

13. The coating premix of claim 12 wherein said protein film former is selected from the group consisting of egg white solids, vital wheat gluten and blends thereof.

14. The coating premix of claim 12 or 13 which is substantially free of saccharides and starches.

15. The coating premix of claim 12 or 13 which is substantially free of wheat flour.

16. The coating premix of claim 12 or 13 wherein said farinaceous material is a blend of corn flour, rice flour and soy flour in effective amounts to give color and crispness.

17. The food composition of claim 1 wherein at least a substantial portion of said flours are crisp-tending flours.

18. The food composition of claim 11 substantially free of wheat flour.

19. A sugarless, dry, edible food coating composition consisting essentially of batter forming ingredients in effective amounts to form, on blending with liquid oil or shortening and water, a batter which, when applied to the surface of a food item, provides on baking a substantially continuous coating having the taste, appearance and texture of a batter coated, deep or pan fried food item, said batter forming ingredients including, based on the weight of the composition,
about 48–85% of a farinaceous material in flour form;
about 2–12% of a plastic or hard shortening or fat; and
at least one structure-building ingredient in an effective amount to form said substantially continuous coating;
said hard shortening or fat being applied to and mixed with the farinaceous material in a manner to render discrete portions of a farinaceous material substantially resistant to hydration by water, said fat having a Wiley Melting Point of about 90 degrees Fahrenheit to about 135 degrees Fahrenheit.

20. The food composition of claim 19 where said structure building ingredient is a blend of about 8–14% vital wheat gluten and about 2–8% egg white solids.

21. The food composition of claim 19 or 20 wherein said farinaceous material is a crisp tending flour or blend of crisp-tending flours.

22. The food composition of claim 19 or 20 further containing a leavening agent.

23. The food composition of claim 19 or 20 wherein said farinaceous material is a blend comprising corn and rice flour.

* * * * *